Patented July 31, 1951

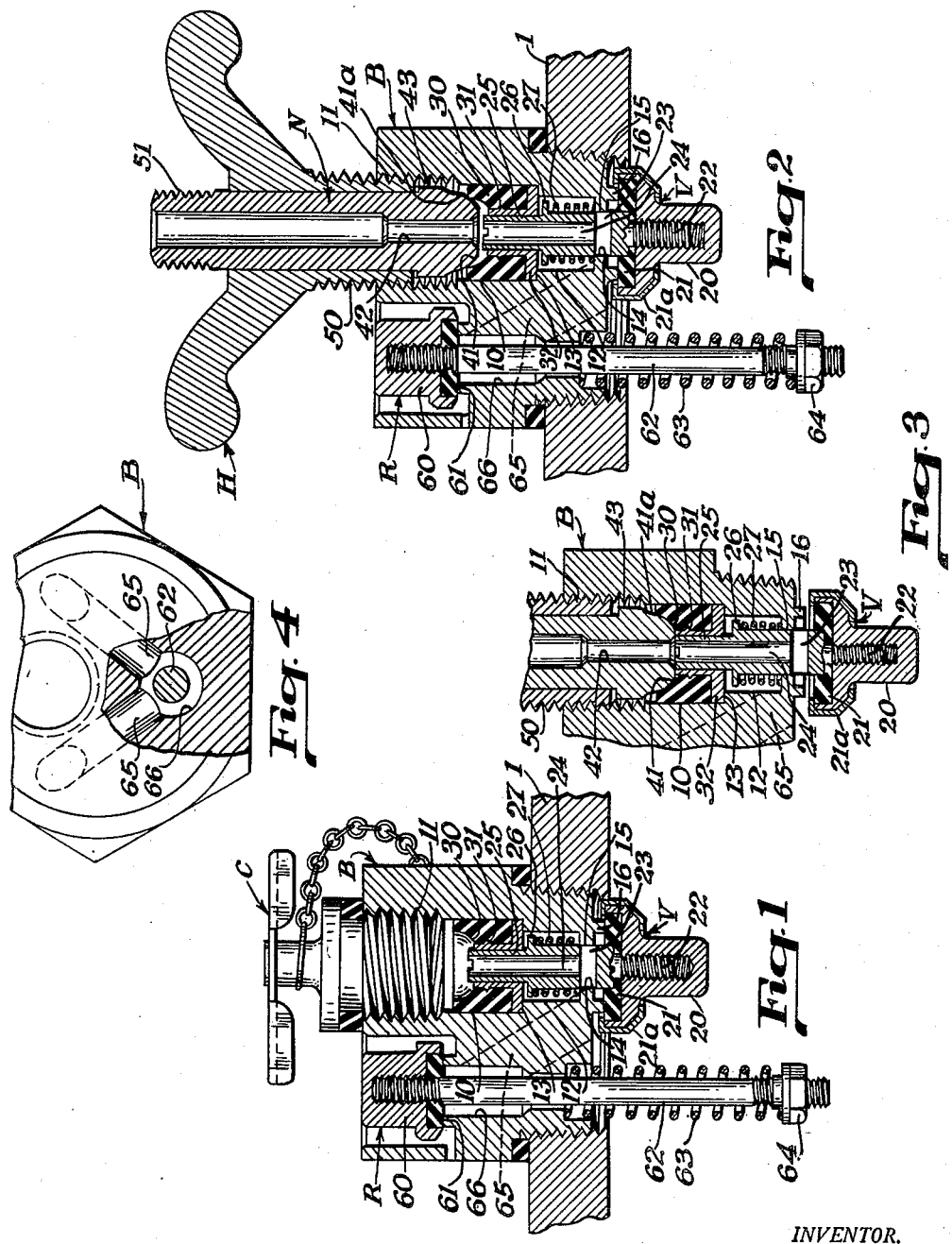

2,562,680

UNITED STATES PATENT OFFICE 2,562,680

SELF-CLOSING DISPENSING VALVE

Joseph N. Paquin, Euclid, Ohio, assignor to The Weatherhead Company, Cleveland, Ohio, a corporation of Ohio Application November 28, 1947, Serial No. 788,535

3 Claims. (Cl. 284—14)

1

This invention relates to a valved tap member or cylinder valve for dispensing gas from the container, that is particularly useful in connection with liquified petroleum gas installations.

The valve to which this invention relates is of the type which has a normally closed outlet valve that is opened by insertion of a dispensing nipple but which is so constructed and arranged that the nipple is sealed with a rubber sealing member in the valve to prevent the escape of fluid to the atmosphere before the nipple opens the outlet valve for dispensing.

It is an object of this invention to provide such a valve which effectively transmits fluid without undue throttling and which provides an effective seal in case the nipple is removed and during its application and removal.

Another object of this invention is the provision of a valve in which the valve seat is external of the valve body and of a large diameter for an effective sealing and ease of machining.

A further object resides in a valve of this nature wherein the dispensing nipple is of the conventional round nose type without fittings or adapters.

A further object resides in a construction which has all the advantages heretofore referred to and in which the valve member is accurately guided within the assembly so that it can be relied upon to provide a perfect seal during the life of the unit.

Other objects will appear as the following detailed description of a preferred embodiment proceeds.

In the drawings:

Fig. 1 is a vertical section through the valve with the sealing cap in place;

Fig. 2 is the same section with the nipple in place but not completely seated;

Fig. 3 is a fragmentary section showing the nipple completely seated and the sealing valve opened; and Fig. 4 is a fragmentary plan view partially sectioned to show the relief passageways.

As seen in Fig. 1, the valve includes a valve body B which mounts a sealing valve V, a relief valve R, and into which is threaded a cap C, when the container is not in use or during shipment thereof. Valve body B is threaded for attachment to the container 1 and has a through bore 10 having a threaded portion 11 which receives the cap C when it is employed and also receives the operating handle H (Fig. 2) used to get the nipple into the valve. A bore 12 communicates with bore 10 to provide a shoulder 13

2 and similarly a bore 14 of reduced section communicates with bore 12 to provide a second shoulder and guiding flange 15 for the valve stem. An external valve seat 16 is formed on the valve body and the passageway through the body may be closed off by the sealing valve assembly V. The latter assembly includes a member 20 on which the sealing disc 21 is mounted by retainer 21a, and a valve stem is threaded to the member 20 as at 22. The valve stem extends into the passageway through the valve body and includes the cross bore 23 communicating with an axial bore 24 for passing fluid through the valve. The upper portion of the valve stem is reduced as at 25 and an intermediate flange 26 is provided on the stem to provide an upper spring seat. The closing spring 27 rests against the upper flange 26 and against the flange 15 integral with the body so that the valve is normally urged into sealing relationship with the seat formed on the body. In order to effect a sealing between the nipple and the valve before the sealing valve is opened, a rubber-like annular sealing washer 30 is attached to or bonded to the metal sleeve member 31 and the assembly pressed into bore 10 in fluid-tight engagement therewith. The sleeve member 31 includes a lower flange 32 which abuts shoulder 13 upon assembly of the valve. The sealing member 30 has a surface 41 for cooperation with a similar surface 41a formed at the lower end of the nipple N. The nipple N is of a standard construction and need not be specifically machined nor modified to work with the valve of this invention. Nipple N has a fluid conducting aperture 42 and is formed with a shoulder 43 for engagement with the threaded shank 50 of the handle H. The relief valve R is provided to relieve excess pressure in the container and includes the valve member 60 cooperating with the valve seat 61 formed on the body. Valve member 60 is normally biased to the closed position by spring 63 surrounding valve stem 62 acting on the valve body and adjusting nut 64. Passageways 65 are formed to provide communication between the inside of the container and the relief valve chamber 66 as seen in Fig. 4. The constructional details of the relief valve form no part of the present invention.

The use and operation of the valve of this invention are as follows:

During storage and shipment the plug or cap C is threaded in the threads 11 on the valve body to protect the assembly and insure a complete seal. When it is desired to remove the fluid from the tank the connector nipple N and its operating handle H are employed, it being understood that the threads such as pipe threads, or the like, 51 are formed on the outer end of the nipple for connection to tubing or flexible hose. As seen in Fig. 2, when the threads 50 are first threaded into the body the nipple approaches the sealing member 30 and makes sealing contact therewith before the end of the nipple engages the upper end of the valve stem. Also, the service nipple expands the rubber member 30 radially to complete the seal against the bore 10 of the body, the clearance above the member 30 providing for slight flow of the rubber. If no such clearance were provided the end of the nipple might not seat on face 41 of the rubber, or in so doing might score or tear the rubber. By the time the end of the nipple has engaged the end of the valve stem, a good fluid seal between the nipple and the sealing member 30 has also been effected. When the sealing valve V is opened by the nipple through the action of the valve stem which acts as a valve operator, fluid is confined to the passageways formed by the nipple and valve parts and cannot escape to the atmosphere. After the sealing valve is cracked, further motion of the nipple brings it fully open until a point is reached wherein the end of the nipple engages the upper end of the sleeve 31, with which the operator becomes aware that the connector is completely assembled. This relationship of parts is shown in Fig. 3 and it can be seen that due to the sealing engagement of the member 30 with the bore 10 of the body and with the surface 41a of the nipple, no fluid can escape and all is confined to the proper fluid conducting passageway. It will further be noted that the valve stem is guided not only by the sleeve member 31 and its upper end, but by the combination spring seat and guiding flange 15 formed at the lower portion of the body. It will also be apparent that I am able to employ a large diameter valve and attain the sealing action as described without restricting the flow appreciably and without modifying or adapting the standard or round nosed nipple commonly employed in connections of this type. It will also be seen that the valve seat 16 is external of the valve body so that it may be readily machined. Also, due to the construction of the sleeve 31 and washer 32 the sealing member 31 is entirely protected from wear due to operation of the valve stem and deterioration which might result from impingement of flowing gases thereagainst. It will be understood that the terms "threads" or "threaded" as employed in the appended claims encompass equivalent arrangements for converting rotary motion into axial motion, such as cam surfaces and the like.

Although I have described a preferred embodiment of my invention, I contemplate that modifications within the realm of mechanical skill may be made therein without departing from the essence of the invention as defined in the appended claims.

What is claimed is:

1. A valved tap for containers comprising a body for fluid-tight attachment to the container, a fluid passageway extending through said body, the wall of said passageway having an outer threaded portion, an intermediate smooth walled portion, and an inner portion of smaller diameter than said intermediate portion whereby an outwardly facing shoulder is formed between said last-named portions, a valve seat formed on said body and surrounding said passageway, check valve means arranged to engage said seat and close said passageway, an annular composite sealing member disposed in the intermediate portion of said passageway, said composite sealing member comprising a centrally-apertured, rubber-like, annular sealing ring and a metal sleeve member in the aperture of said ring, the rubber-like ring having a concave sealing surface surrounding said aperture and facing away from said check valve means and adapted for engagement with a convex nose of an apertured service nipple attachable by said threaded portion, the inner end of said sleeve member engaging said shoulder and the outer end of said sleeve member acting as a stop for the service nipple, valve operator means attached to said valve means and extending into the aperture in said sleeve member, spring seat means on said body and on said operator and a spring therebetween tending to close said valve means with said body spring seat guiding said operator, said valve operator means being so constructed and arranged that said rubber-like sealing ring is expanded against said intermediate passageway portion when a nipple is forced into engagement with said sealing ring, and the valve is unseated by the nipple after sealing engagement of the nipple and sealing member has been effected.

2. A valved tap for containers comprising a body for fluid-tight attachment to the container, a fluid passageway extending through said body, the wall of said passageway having an outer threaded portion, an intermediate smooth walled portion, and an inner portion of smaller diameter than said intermediate portion whereby an outwardly facing shoulder is formed between said last-named portions, an external valve seat formed on said body and surrounding said passageway, check valve means arranged to engage said seat and close said passageway, an annular composite sealing member disposed in the intermediate portion of said passageway, said composite sealing member comprising a centrally-apertured, rubber-like, annular sealing ring and a metal sleeve member in the aperture of said ring, the rubber-like ring having a concave sealing surface surrounding said aperture and facing away from said check valve means and adapted for engagement with a convex nose of an apertured service nipple attachable by said threaded portion, the inner end of said sleeve member engaging said shoulder and the outer end of said sleeve member acting as a stop for the service nipple, valve operator means attached to said valve means and extending into the aperture in said sleeve member, spring seat means on said body and on said operator and a spring therebetween tending to close said valve means with said body spring seat guiding said operator, said valve operator means and sealing ring being so constructed and arranged that said rubber-like sealing ring is expanded against said intermediate passageway portion when a nipple is forced into engagement with said sealing ring, and the valve is unseated by the nipple after sealing engagement of the nipple and sealing member has been effected.

3. A valved tap for containers comprising a body including a threaded mounting portion for fluid-tight attachment to the container, a fluid passageway extending through said body, said mounting portion having a generally flat end portion subject to vapor pressure in the container, the wall of said passageway having an outer threaded portion, an intermediate smooth walled portion, and an inner portion of smaller diameter than said intermediate portion whereby an outwardly facing shoulder is formed between said last-named portions, an external valve seat formed on the flat end portion of said body mounting portion and surrounding said passageway, check valve means arranged to engage said seat and close said passageway, an annular composite sealing member disposed in the intermediate portion of said passageway, said composite sealing member comprising a centrally-apertured, rubber-like, annular sealing ring and a metal sleeve member in the aperture of said ring, the rubber-like ring having a concave sealing surface surrounding said aperture and facing away from said check valve means and adapted for engagement with a convex nose of an apertured service nipple attachable by said threaded portion, the inner end of said sleeve member engaging said shoulder and the outer end of said sleeve member acting as a stop for the service nipple, valve operator means attached to said valve means and extending into the aperture in said sleeve member, spring seat means in said body passageway inwardly of said external valve seat, a spring seat on said operator and a spring between said seats tending to close said valve means with said body spring seat guiding said operator, said valve operator means and sealing ring being so constructed and arranged that said rubber-like sealing ring is expanded against said intermediate passageway portion when a nipple is forced into engagement with said sealing ring, and the valve is unseated by the nipple after sealing engagement of the nipple and sealing member has been effected.

JOSEPH N. PAQUIN.

REFERENCES CITED

The following references are of record in the file of this patent:

UNITED STATES PATENTS

| Number | Name | Date |
|---|---|---|
| 1,996,900 | Buckner | Apr. 9, 1935 |
| 2,173,295 | Coles et al. | Sept. 19, 1939 |
| 2,248,701 | Fowler | July 8, 1941 |
| 2,283,970 | Buttner | May 26, 1942 |
| 2,295,821 | Wyss | Sept. 15, 1942 |
| 2,412,685 | Hoffman et al. | Dec. 17, 1946 |
| 2,461,940 | Sundstrom | Feb. 15, 1949 |